US008531124B2

(12) United States Patent
Komatsu et al.

(10) Patent No.: US 8,531,124 B2
(45) Date of Patent: Sep. 10, 2013

(54) HIGH PRESSURE DISCHARGE LAMP LIGHTING DEVICE AND ILLUMINATION INSTRUMENT

(75) Inventors: Naoki Komatsu, Kobe (JP); Jun Kumagai, Suita (JP)

(73) Assignee: Panasonic Corporation, Osaka (JP)

( * ) Notice: Subject to any disclaimer, the term of this patent is extended or adjusted under 35 U.S.C. 154(b) by 414 days.

(21) Appl. No.: 12/994,473

(22) PCT Filed: May 12, 2009

(86) PCT No.: PCT/JP2009/058842
§ 371 (c)(1),
(2), (4) Date: Nov. 24, 2010

(87) PCT Pub. No.: WO2009/145052
PCT Pub. Date: Dec. 3, 2009

(65) Prior Publication Data
US 2011/0068714 A1 Mar. 24, 2011

(30) Foreign Application Priority Data
May 27, 2008 (JP) ................................. 2008-138672

(51) Int. Cl.
*H05B 41/16* (2006.01)
(52) U.S. Cl.
USPC ............................ 315/247; 315/224; 315/291
(58) Field of Classification Search
USPC ................. 315/225, 224, 226, 308, 309, 291, 315/209 R, 247
See application file for complete search history.

(56) References Cited

U.S. PATENT DOCUMENTS

| | | | | |
|---|---|---|---|---|
| 5,582,479 | A | * 12/1996 | Thomas et al. | 362/277 |
| 7,391,165 | B2 | * 6/2008 | Lee et al. | 315/247 |
| 7,622,869 | B2 | * 11/2009 | Watanabe et al. | 315/291 |
| 2006/0279230 | A1 | * 12/2006 | Lee et al. | 315/247 |

FOREIGN PATENT DOCUMENTS

| | | |
|---|---|---|
| JP | 2001-297890 | 10/2001 |
| JP | 2003-168588 | 6/2003 |
| JP | 2003-203790 | 7/2003 |
| JP | 2003-217888 | 7/2003 |
| JP | 2003-244955 | 8/2003 |
| JP | 2004-221031 | 8/2004 |
| JP | 3846619 | 9/2006 |

OTHER PUBLICATIONS

Japanese Official Action dated Jul. 10, 2012, and a partial English language translation thereof.

* cited by examiner

*Primary Examiner* — Douglas W Owens
*Assistant Examiner* — Amy Yang
(74) *Attorney, Agent, or Firm* — Greenblum & Bernstein, P.L.C.

(57) ABSTRACT

In an event of switching a DC output voltage of a boost chopper circuit from a first DC output voltage to a second DC output voltage, a boost chopper control circuit operates a boost chopper circuit intermittently. Therefore, a stop period of the boost chopper circuit is shortened as compared with a case where the boost chopper control circuit does not operate the boost chopper circuit intermittently. As a result, it becomes possible to supply a control power also when the DC output voltage of the boost chopper circuit is switched at a starting time of a high pressure discharge lamp while avoiding size and cost increases of a power supply circuit that supplies the control power.

4 Claims, 5 Drawing Sheets

HIGH PRESSURE DISCHARGE LAMP LIGHTING DEVICE AND ILLUMINATION INSTRUMENT

TECHNICAL FIELD

The present invention relates to a high pressure discharge lamp lighting device that lights a high pressure discharge lamp, and to an illumination instrument including the high pressure discharge lamp lighting device.

BACKGROUND ART

Heretofore, a lighting device as described in Patent Literature 1 has been proposed as a high pressure discharge lamp lighting device that lights a high pressure discharge lamp such as a high-intensity discharge lamp (HID lamp). In a conventional example described in Patent Literature 1, instead of applying a high-voltage pulse to the high pressure discharge lamp from an igniter (starting circuit) at a starting time, an output voltage of a boost chopper circuit at the starting time is increased more than an output voltage at a time of steady lighting, whereby the high pressure discharge lamp is started.

Moreover, in the above-described conventional example, a power supply of a control circuit (control power supply) for adjusting the output voltage of the boost chopper circuit is obtained from an induced voltage that is induced in a winding magnetically coupled to an inductor that composes the boost chopper circuit.

CITATION LIST

Patent Literature

Patent Literature 1: Japanese Patent No. 3846619

SUMMARY OF INVENTION

Technical Problem

Incidentally, in the case of increasing and reducing the output voltage of the boost chopper circuit before and after the start of the high pressure discharge lamp as in the above-described conventional example, power consumed in the high pressure discharge lamp immediately after the start is small. Accordingly, a both-end voltage of a smoothing capacitor provided on an output stage of the boost chopper circuit is not lowered soon. Therefore, in some case, controlling means that is performing feedback control so as to allow the output voltage to coincide with a target value has temporarily stopped the boost chopper circuit. Then, when the boost chopper circuit is stopped, the induced voltage ceases to be induced in the winding magnetically coupled to the inductor of the boost chopper circuit, and accordingly, it has been apprehended that supply of the control power to the controlling means may also be stopped. For this matter, capacitance of the capacitor for smoothing the induced voltage is increased, thus making it possible to supply the control power also while the boost chopper circuit is stopped. However, there is a problem that such an increase of the capacitance of the capacitor brings about size and cost increases of a power supply circuit that supplies the control power.

The present invention has been made in consideration of the above-described circumstances. It is an object of the present invention to provide a high pressure discharge lamp lighting device and an illumination instrument, which are capable of supplying the control power also when a DC output voltage of the boost chopper circuit is switched at the starting time of the high pressure discharge lamp while avoiding the size and cost increases of the power supply circuit that supplies the control power.

Solution to Problem

In order to achieve the foregoing object, an invention of claim 1 is a high pressure discharge lamp lighting device including: a boost chopper circuit that boosts a DC input voltage to a desired DC output voltage; a boost chopper control circuit that controls the boost chopper circuit to allow a DC output voltage of the boost chopper circuit to coincide with the desired DC output voltage; a power conversion circuit that converts a DC output of the boost chopper circuit into power necessary to start and light a high pressure discharge lamp; a power conversion control circuit that controls the power conversion circuit to adjust the power to be supplied to the high pressure discharge lamp; and a control power supply circuit that supplies a control power for an operation to at least the boost chopper control circuit, wherein the boost chopper circuit includes: an inductor; a switching element that connects and disconnects a current flowing through the inductor; a rectifier that rectifies the current flowing out of the inductor; and a smoothing capacitor that smoothes the current rectified by the rectifier, the control power supply circuit includes a winding magnetically coupled to the inductor provided in the boost chopper circuit, and obtains the control power by rectifying and smoothing an induced voltage induced in the winding, and the boost chopper control circuit controls the DC output voltage of the boost chopper circuit to coincide with a first DC output voltage at a starting time of the high pressure discharge lamp, allows the output voltage of the boost chopper circuit to coincide with a second DC output voltage lower than the first DC output voltage after the high pressure discharge lamp is started, and operates the boost chopper circuit intermittently in an event of switching the DC output voltage of the boost chopper circuit from the first DC output voltage to the second DC output voltage.

In accordance with the invention of claim 1, in the event of switching the DC output voltage of the boost chopper circuit from the first DC output voltage to the second DC output voltage, the boost chopper control circuit operates the boost chopper circuit intermittently. Therefore, a stop period of the boost chopper circuit is shortened as compared with the case where the boost chopper control circuit does not operate the boost chopper circuit intermittently. As a result, it becomes possible to supply a control power also when the DC output voltage of the boost chopper circuit is switched at the starting time of the high pressure discharge lamp while avoiding the size and cost increases of the power supply circuit that supplies the control power.

In an invention of claim 2 according to the invention of claim 1, the boost chopper control circuit detects the DC output voltage of the boost chopper circuit, and performs feedback control so as to allow a detected value of the DC output voltage to coincide with a target value thereof, in which, in the event of switching the DC output voltage of the boost chopper circuit from the first DC output voltage to the second DC output voltage, a first target value corresponding to the first DC output voltage and a second target value corresponding to the second DC output voltage or a first detected value corresponding to the first DC output voltage and a second detected value corresponding to the second DC output voltage are alternately switched.

In an invention of claim 3 according to the invention of claim 1, the boost chopper control circuit detects the DC output voltage of the boost chopper circuit, and performs feedback control so as to allow a detected value of the DC output voltage to coincide with a target value thereof, in which, in the event of switching the DC output voltage of the boost chopper circuit from the first DC output voltage to the second DC output voltage, the DC output voltage of the boost chopper circuit is switched to a third target value corresponding to a third DC output voltage lower than the first DC output voltage and higher than the second DC output voltage or to a third detected value corresponding to the third DC output voltage, and thereafter, is switched to a second target value corresponding to the second DC output voltage or a second detected value corresponding to the second DC output voltage.

In an invention of claim 4 according to any one of the inventions of claims 1 to 3, a voltage difference between the first DC output voltage and the second DC output voltage is 30 volts or more.

In order to achieve the foregoing object, an invention of claim 5 is an illumination instrument including: the high pressure discharge lamp lighting device according to any one of the inventions of claims 1 to 4; and an instrument main body that holds the high pressure discharge lamp lighting device and a high pressure discharge lamp.

Advantageous Effects of Invention

In accordance with the present invention, it becomes possible to supply the control power also when the DC output voltage of the boost chopper circuit is switched at the starting time of the high pressure discharge lamp while avoiding the size and cost increases of the power supply circuit that supplies the control power.

DESCRIPTION OF EMBODIMENTS

A description is made below in detail of embodiments of the present invention.

Embodiment 1

Figure 1:
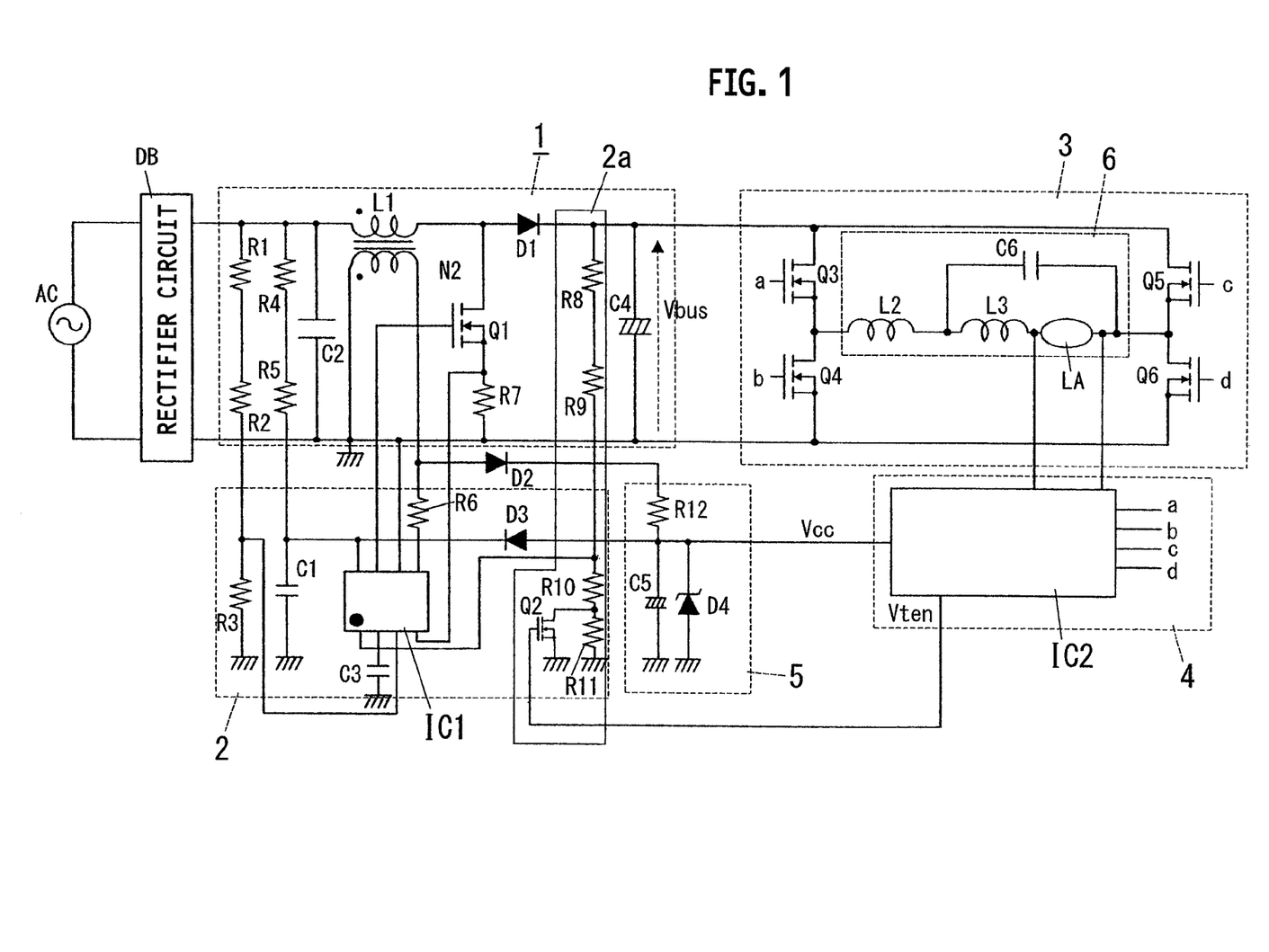
FIG. 1 is a circuit diagram illustrating Embodiment 1 of a high pressure discharge lamp lighting device according to the present invention.

As illustrated in FIG. 1, a high pressure discharge lamp lighting device of this embodiment includes: a boost chopper circuit 1 that boosts a DC input voltage, which is formed by performing full-wave rectification for an AC power source AC by a rectifier circuit DB, to a desired DC output voltage Vbus; a boost chopper control circuit 2 that performs switching control for a switching element Q1 that composes the boost chopper circuit 1; a power conversion circuit 3 that converts such a DC output of the boost chopper circuit 1 into a desired AC output; a power conversion control circuit 4 that controls the power conversion circuit 3 to adjust power to be supplied to a high pressure discharge lamp LA; and a control power supply circuit 5 that supplies an operation power supply (control power Vcc) to a boost chopper control unit IC1 that composes the boost chopper control circuit 2, and to a power conversion control unit IC2 that composes the power conversion control circuit 4.

The boost chopper circuit 1 is a circuit heretofore well known, and includes: an inductor L1 in which one end is connected to a high potential-side output end of the rectifier circuit DB; the switching element Q1 composed of a field-effect transistor inserted between the other end of the inductor L1 and a low potential-side output end of the rectifier circuit DB together with a resistor R7; a diode D1 in which an anode is connected to a node between the inductor L1 and the switching element Q1; and a smoothing capacitor C4 inserted between a cathode of the diode D1 and the low potential-side output end of the rectifier circuit DB. Note that a secondary winding N2 is magnetically coupled to the inductor L2.

The boost chopper control circuit 2 includes: the boost chopper control unit IC1 that performs switching control (PWM control) for the switching element Q1; voltage dividing resistors R1, R2 and R3 which divide the DC input voltage inputted from the rectifier circuit DB to the boost chopper circuit 1; a series circuit of resistors R4 and R5 and a capacitor C1, which are connected between the output ends of the rectifier circuit DB for supplying the operation power supply to the boost chopper control unit IC1 at the time when the power supply is turned on; and a voltage detection circuit 2a for detecting the DC output voltage Vbus of the boost chopper circuit 1. The boost chopper control unit IC1 is composed of, for example, a power factor improving control IC (model number: MC33262) made by ON Semiconductor Corporation, and performs feedback control (PWM control) for adjusting an ON-duty ratio of the switching element Q1 so as to allow a detected value (voltage value corresponding to the DC output voltage Vbus of the boost chopper circuit 1) of the voltage detection circuit 2a to coincide with a desired target value. Moreover, the boost chopper control circuit IC1 detects the DC input voltage, which is inputted to the boost chopper circuit 1, by a series circuit of the resistors R1, R2 and R3, and detects an input current, which flows through the inductor L1, by an induced voltage induced in the secondary winding N2, thereby performs power factor improving control for imparting resistivity to the circuit so that phases of the input current and the DC input voltage cannot be shifted from each other.

The voltage detection circuit 2a is composed of: a series circuit of four voltage dividing resistors R8, R9, R10, and R11 connected in parallel to the smoothing capacitor C4 that composes the boost chopper circuit 1; and a switching element Q2 that is connected in parallel to the voltage dividing resistor R11 in which one end is connected to the ground, and short-circuits both ends of the voltage dividing resistor R11 so as to be freely openable and closable. Note that, as will be described later, the switching element Q2 is turned on/off by a control signal Vten outputted from the power conversion control circuit 4.

The power conversion circuit 3 is a so-called full-bridge circuit, and is composed in such a manner that a series circuit of two switching elements Q3 and Q4 formed of field-effect transistors and a series circuit of two switching elements Q5 and Q6 also formed of field-effect transistors are connected in parallel to each other between output ends of the boost chopper circuit 1, and that a load circuit 6 including a high pressure discharge lamp LA is connected between midpoints (node between the switching elements Q3 and Q4 and node between the switching elements Q5 and Q6) of both of the series circuits. The load circuit 6 includes: a series circuit of two inductors L2 and L3 and the high pressure discharge lamp LA; and a capacitor C6 connected in parallel to the inductor L3 and the high pressure discharge lamp LA, in which the inductor L2 and the capacitor C6 compose a resonant circuit.

The power conversion control unit IC2 is composed of, for example, a microcomputer, detects a voltage applied to the high pressure discharge lamp LA (lamp voltage), and detects, in response to a result of such detection, a state of the high pressure discharge lamp LA (being lighted, being tuned out, and so on). Moreover, from the power conversion control unit IC2, drive signals a to d are outputted, which drive the switching elements Q3 to Q6 of the power conversion circuit 3.

The control power supply circuit 5 is composed of a diode D2 in which an anode is connected to a node between the secondary winding N2 and a resistor R6; a resistor R12 in which one end is connected to a cathode of the diode D2; a smoothing capacitor C5 inserted between the other end of the resistor R12 and the ground; and a Zener diode D4 connected in parallel to the smoothing capacitor C5. The control power supply circuit 5 rectifies the induced voltage, which is induced in the secondary winding N2, by the diode D2, smoothes the induced voltage by the smoothing capacitor C5, and clamps the induced voltage by the Zener diode D4, thereby generates a substantially constant control power Vcc. Note that the control power Vcc generated by the control power supply circuit 5 is supplied to the boost chopper control unit IC1 through a diode D3, and is supplied to the power conversion control unit IC2.

A description is made below of basic operations of the high pressure discharge lamp lighting device of this embodiment. However, the following basic operations are merely an example, and the high pressure discharge lamp lighting device is also capable of performing other operations within the scope without departing from the spirit of the present invention.

(Starting Mode)

First, in order to start the high pressure discharge lamp LA, it is necessary to break down insulation between electrodes thereof by applying a high voltage between the electrodes. In this embodiment, the power conversion control unit IC2 alternately switches between two pairs in the power conversion circuit 3, which are a pair of the switching elements Q3 and Q6 and a pair of the switching elements Q4 and Q5, at a frequency close to a resonant frequency of the resonant circuit composed of the inductor L2 and the capacitor C6. In such a way, the power conversion control unit IC2 applies, between the electrodes of the high pressure discharge lamp LA, a high voltage (resonant voltage) sufficiently higher (for example, several kilovolts) than the DC output voltage Vbus of the boost chopper circuit 1, and thereby starts the high pressure discharge lamp LA. However, another configuration may be adopted, in which a resonant circuit composed of a capacitor having one end connected to a part of a winding of the inductor L2 and a resistor connected in series to the other end of the capacitor concerned is provided, and such a high voltage for starting the high pressure discharge lamp LA is generated by the resonant circuit concerned. Note that, in this starting mode, the high-level control signal Vten is outputted from the power conversion control unit IC2, the switching element Q2 of the voltage detection circuit 2a is turned on, and both ends of the voltage dividing resistor R11 are short-circuited by the switching element Q2, whereby the detected value becomes a relatively small value (hereinafter, referred to as a first detected value). At this time, with respect to the target value of the boost chopper circuit 1, the first detected value inputted from the voltage detection circuit 2a to the boost chopper control unit IC1 becomes lower than when the switching element Q2 is turned off. Accordingly, in order to approximate the first detected value to the target value, the boost chopper control unit IC1 raises the DC output voltage of the boost chopper circuit 1. The DC output voltage Vbus at this time is a first DC output voltage V1, and for example, is approximately 300 volts.

(Low Lamp Voltage Mode)

After the high pressure discharge lamp LA is started, the power conversion control unit IC2 switches a switching mode of the switching elements Q3 to Q6. In a low lamp voltage range approximately from 0 to 60 volts before the lamp voltage reaches 90 to 110 volts as an approximate rated lighting voltage, the power conversion control unit IC2 performs control to flow a larger lamp current through the high pressure discharge lamp LA so that the high pressure discharge lamp LA can be prevented from being faded and can be warmed rapidly. Note that, when an operation mode of the high pressure discharge lamp lighting device is switched from the starting mode to the low lamp voltage mode, the control signal Vten outputted from the power conversion control unit IC2 is switched from such a high-level to a low-level, and the switching element Q2 of the voltage detection circuit 2a is turned off, whereby the detected value becomes a relatively large value (hereinafter, referred to as a second detected value). At this time, with respect to the target value of the boost chopper circuit 1, the second detected value inputted from the voltage detection circuit 2a to the boost chopper control unit IC1 becomes higher than the first detected value. Accordingly, in order to approximate the second detected value to the target value, the boost chopper control unit IC1 stops the boost chopper circuit 1. Note that the DC output voltage Vbus corresponding to the second detected value is defined as a second DC output voltage V2.

(Stable Lighting Mode)

When the high pressure discharge lamp LA is warmed and a tube voltage of the high pressure discharge lamp LA reaches the approximate rated lamp voltage, the power conversion control unit IC2 further switches the switching mode of the switching elements Q3 to Q6, and flows a lamp current with a triangular wave shape through the high pressure discharge lamp LA. Note that, in such a stable lighting mode, the DC output voltage Vbus that is approximately 2 to 2.5 times the rated lamp voltage (for example, approximately 160 to 270 volts) is supplied from the boost chopper circuit 1 to the power conversion circuit 3. Hence, a voltage difference between the first DC output voltage V1 and the second DC output voltage V2 becomes 30 volts (=300−270) or more.

Next, a description is made of, as the spirit of the present invention, operations when the operation mode is switched from the starting mode to the low lamp voltage mode.

Figure 2:
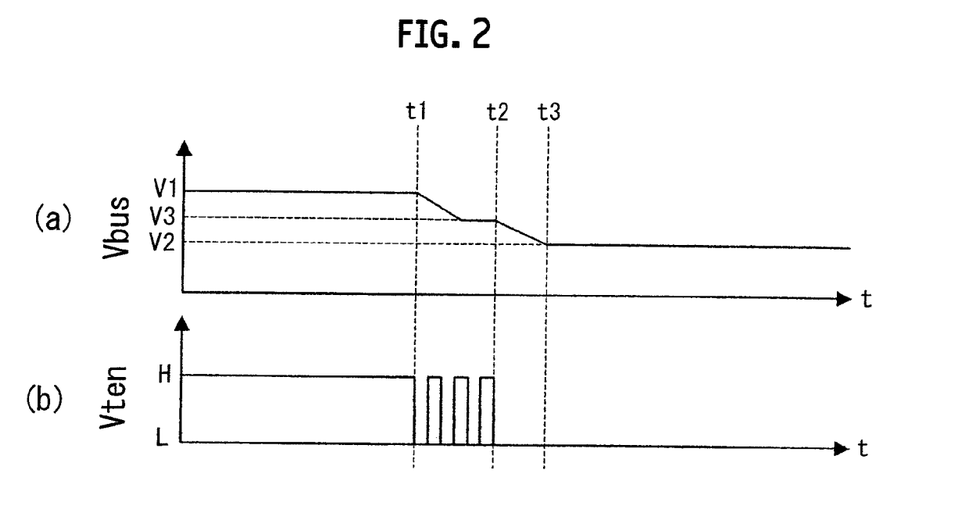
FIGS. 2(a) and 2(b) are operation explanatory diagrams of Embodiment 1.

As illustrated in FIG. 2(b), in the event where the power conversion control unit IC2 shifts from the starting mode to the low lamp voltage mode, when an extremely short time (for example, several hundred microseconds) elapses after the control signal Vten is switched from the high-level to the low-level at an ending time point t1 of the starting mode, the control signal Vten is switched from the low-level to the high-level one more time, and thereafter, until a time point t2 when a predetermined time elapses from the ending time point t1 of the starting mode, the control signal Vten is alternately switched between the low-level and the high-level in an extremely short cycle (for example, several hundred microseconds). When the control signal Vten is switched between the high-level and the low-level in the short cycle as described above, the boost chopper control unit IC1 controls the boost chopper circuit 1 to alternately switch the DC output voltage Vbus between the first DC output voltage V1 and the second DC output voltage V2. Therefore, the DC output voltage Vbus of the boost chopper circuit 1 during such a period from the ending time point t1 of the starting mode to the time point t2 when the predetermined time elapses therefrom (for example, several hundred milliseconds) becomes a voltage V3 to the eye, which is located between the first DC output voltage V1 and the second DC output voltage V2 (refer to FIG. 2(a)). Then, at the elapsed time point t2 of the predetermined time, the power conversion control unit IC2 fixes the control signal Vten to the low-level. When the control signal Vten is fixed to the low-level, the boost chopper control unit IC1 temporarily stops the boost chopper circuit 1 in order to control the boost chopper circuit 1 so that the DC output voltage Vbus can be the second DC output voltage V2. However, at this time point, the DC output voltage Vbus of the boost chopper circuit 1 is lowered to the voltage V3 lower than the first DC output voltage V1. Accordingly, at a time point t3 when an extremely short time elapses from the elapsed time point t2 of the predetermined time, the DC output voltage Vbus drops to the second DC output voltage V2 (refer to FIG. 2(a)).

Incidentally, if the control signal Vten is switched from the high-level to the low-level and is fixed to the low-level at the ending time point t1 of the starting mode, then the boost chopper circuit 1 is stopped during a period while the DC output voltage Vbus is dropping from the first DC output voltage V1 to the second DC output voltage V2 (period from t1 to t3), and the induced voltage ceases to be induced in the secondary winding N2 magnetically coupled to the inductor L1 of the boost chopper circuit 1, and therefore, it becomes impossible for the control power supply circuit 5 to generate the control power Vcc. As opposed to this, in this embodiment, the control signal Vten is alternately switched between the low-level and the high-level during the period from the ending time point t1 to the elapsed time point t2, whereby the boost chopper circuit 1 is operated intermittently. Accordingly, during the period from t1 to t2, the induced voltage is induced intermittently in the secondary winding N2 as mentioned above, and therefore, it becomes possible for the control power supply circuit 5 to generate the control power Vcc. In addition, the period while the boost chopper circuit 1 is temporarily stopped (period from t2 to t3) can be shortened.

As mentioned above, in accordance with this embodiment, in the event of switching the DC output voltage Vbus of the boost chopper circuit 1 from the first DC output voltage V1 to the second DC output voltage V2, the boost chopper control circuit 2 operates the boost chopper circuit 1 intermittently. Accordingly, the stop period of the boost chopper circuit 1 is shortened as compared with the case where the boost chopper circuit 1 is not operated intermittently. As a result, it becomes possible to supply the control power Vcc also when the DC output voltage Vbus of the boost chopper circuit 1 is switched at the starting time of the high pressure discharge lamp LA while avoiding size and cost increases of the control power supply circuit 5 that supplies the control power Vcc. Note that, in this embodiment, the detected value of the voltage detection circuit 2a is switched by the power conversion control unit IC2 in order to operate the boost chopper circuit 1 intermittently; however, it is possible to operate the boost chopper circuit 1 intermittently also in such a manner that the target value of the DC output voltage Vbus in the boost chopper control circuit 2 is switched instead of switching the detected value.

Figure 3:
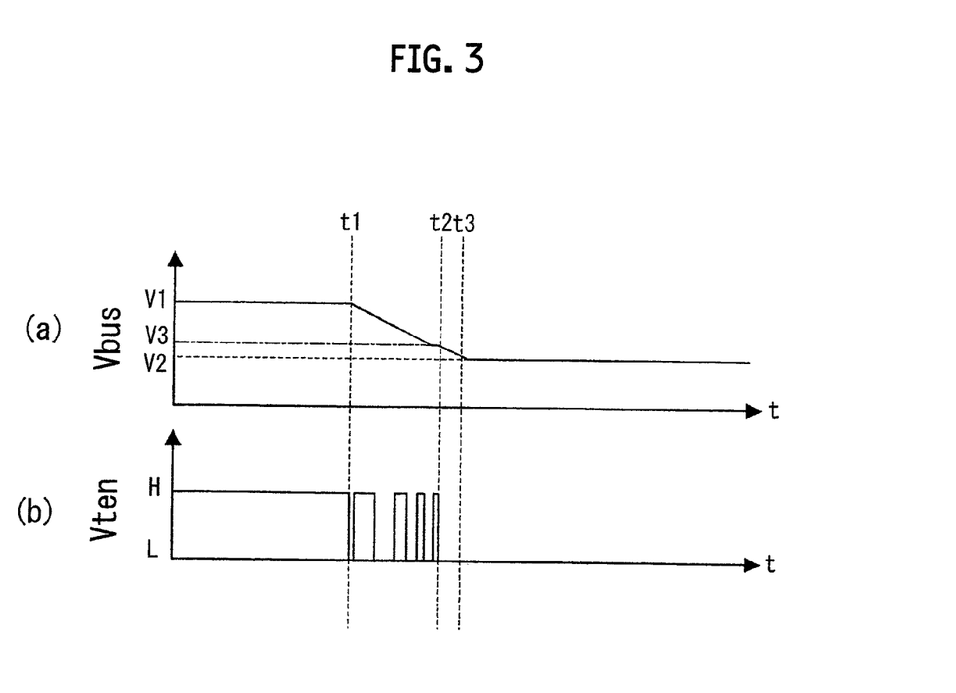
FIGS. 3(a) and 3(b) are other operation explanatory diagrams of Embodiment 1.

Incidentally, as illustrated in FIG. 3(b), with regard to the control signal Vten outputted from the power conversion control unit IC2 during the period from the ending time point t1 of the starting mode to the elapsed time point t2, if a ratio H/L of a high-level time (H) to a low-level time (L) is made gradually smaller, then as illustrated in FIG. 3(a), the voltage V3 at which the DC output voltage Vbus of the boost chopper circuit 1 is temporarily stabilized can be approximated to the second DC output voltage V2. As a result, it becomes possible to further shorten the stop period of the boost chopper circuit 1, which corresponds to the period from t2 to t3.

Embodiment 2

Figure 4:
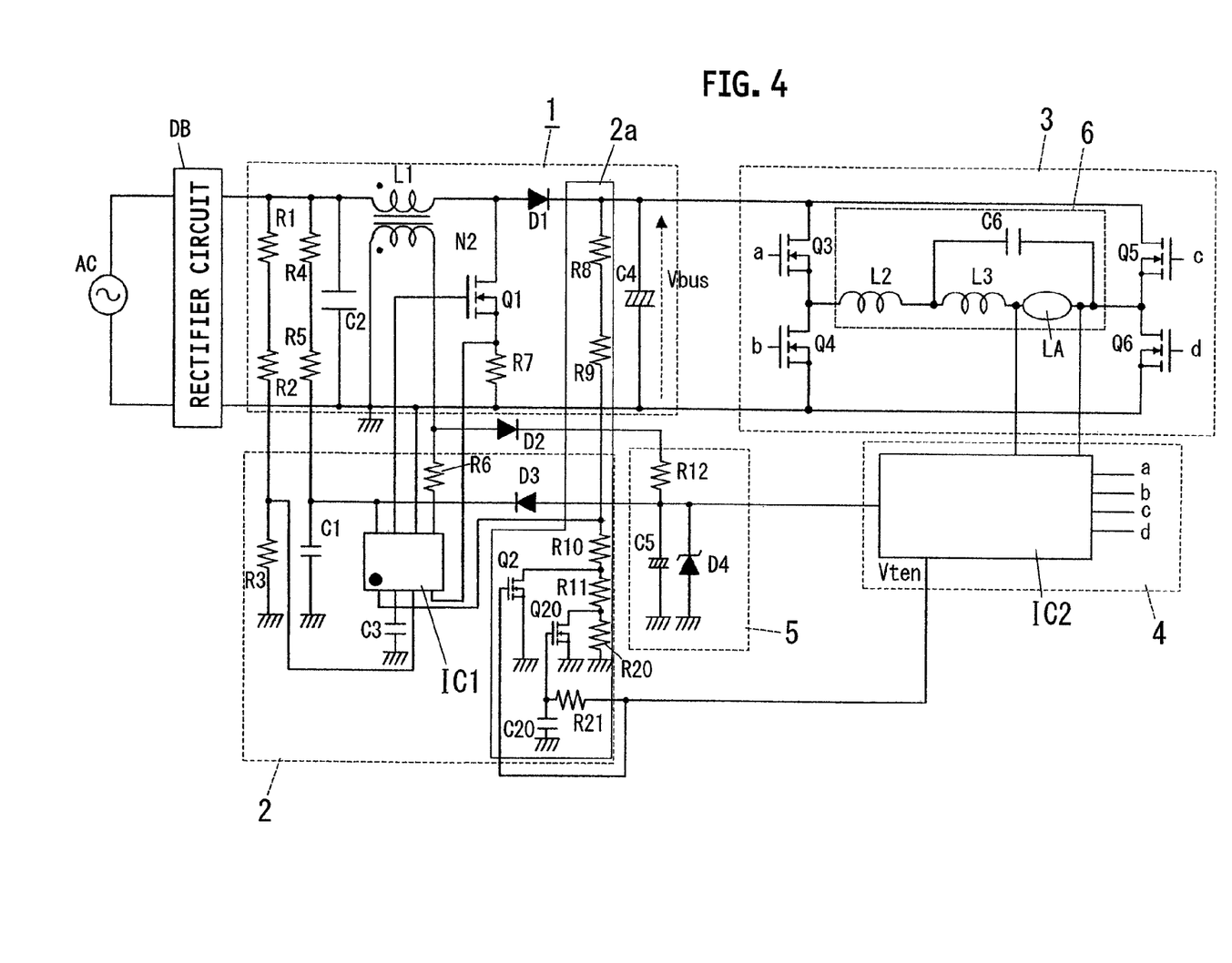
FIG. 4 is a circuit diagram illustrating Embodiment 2 of a high pressure discharge lamp lighting device according to the present invention.

As illustrated in FIG. 4, the high pressure discharge lamp lighting device of this embodiment has a feature in the configuration of the voltage detection circuit 2a, in which other configurations are common to those of Embodiment 1. Hence, the same reference numerals are assigned to constituents common to those of Embodiment 1, and a description thereof is omitted.

The voltage detection circuit 2a in this embodiment is different from that in Embodiment 1 in that there are added: a voltage dividing resistor R20 inserted between the voltage dividing resistor R11 and the ground; a switching element Q20 composed of a field-effect transistor connected in parallel to the voltage dividing resistor R20; and a delay circuit, which is composed of a capacitor C20 and a resistor R21, and delays the control signal Vten in the low-level inputted from the power conversion control unit IC2 to a gate of the switching element Q20.

Next, a description is made of, as the spirit of the present invention, operations when the operation mode is switched from the starting mode to the low lamp voltage mode.

Figure 5:
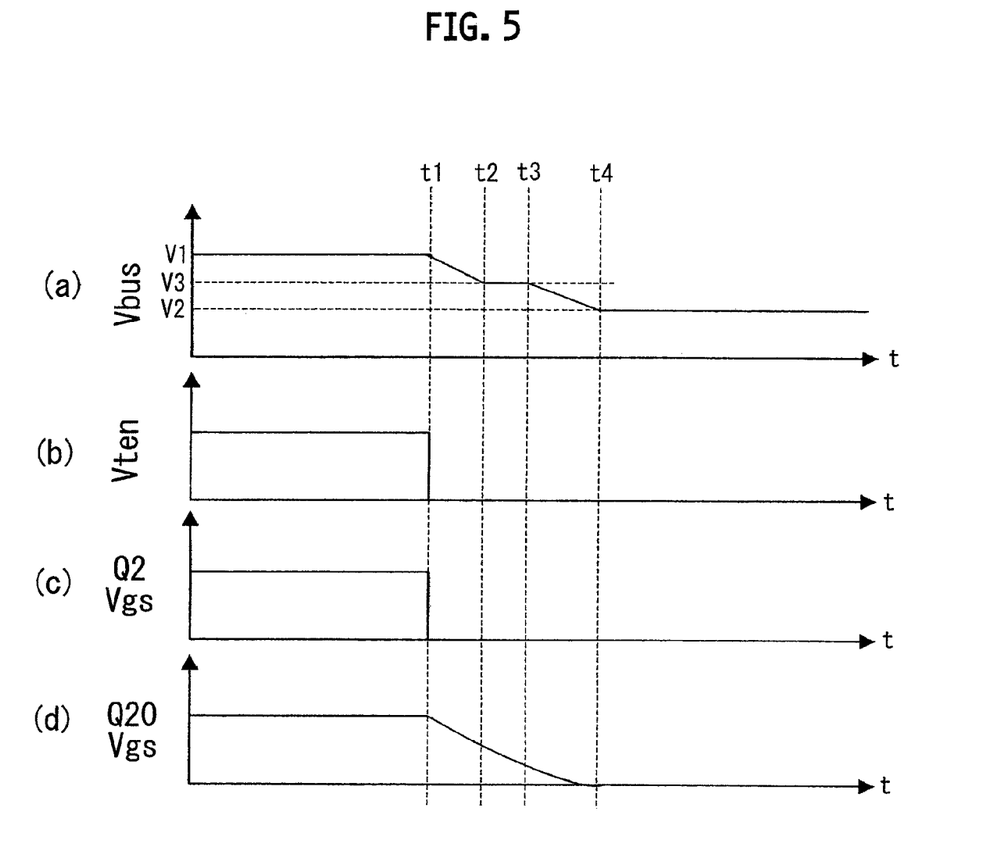
FIGS. 5(a) to 5(d) are operation explanatory diagrams of Embodiment 2.

As illustrated in FIG. 5(b), in the event of shifting from the starting mode to the low lamp voltage mode, the power conversion control unit IC2 switches the control signal Vten from the high-level to the low-level at the ending time point t1 of the starting mode. At this time, as illustrated in FIG. 5(c), the gate voltage Vgs at the switching element Q2 of the voltage detection circuit 2a is rapidly turning to the low-level, and the switching element Q2 is immediately turned off. Meanwhile, as illustrated in FIG. 5(d), the gate voltage Vgs at the switching element Q20 is gradually shifted to the lower-level by a function of the delay circuit (capacitor C20 and resistor R21), and as a result, the switching element Q20 is not turned off until the time point t3 when a predetermined time elapses from the ending time point t1. During a period while the switching element Q2 is turned off and the switching element Q20 is turned on (period from t1 to t3), a detected value smaller than the first detected value and larger than the second detected value (third detected value) is outputted from the voltage detection circuit 2a to the boost chopper control unit IC1. Accordingly, the boost chopper circuit 1 is stopped until the time point t2 (<t3) when the predetermined time elapses from the ending time point t1 of the starting mode. However, as illustrated in FIG. 5(a), during the period from the time point t2 to the time point t3, while the DC output voltage Vbus of the boost chopper circuit 1 is lowered to the third DC output voltage V3 corresponding to the third detected value, the boost chopper circuit 1 operates continuously.

Then, when the switching element Q20 is turned off at the time point t3, the detected value outputted from the voltage detection circuit 2a to the boost chopper control unit IC1 is switched from the third detected value to the second detected value. Accordingly, the boost chopper circuit 1 is stopped one more time. Then, the boost chopper circuit 1 operates continuously one more time from a time point t4 when the DC output voltage Vbus of the boost chopper circuit 1 is lowered to the second DC output voltage V2 (refer to FIG. 5(a)).

As mentioned above, also in this embodiment, in the event of switching the DC output voltage Vbus of the boost chopper circuit 1 from the first DC output voltage V1 to the second DC output voltage V2, the boost chopper circuit 1 is operated intermittently by providing the periods (t1 to t2, t3 to t4) while the boost chopper circuit 1 is stopped and the period (t2 to t3) while the boost chopper circuit 1 is operated. Accordingly, similarly as in Embodiment 1, the stop period of the boost chopper circuit 1 is shortened as compared with the case where the boost chopper circuit 1 is not operated intermittently. As a result, it becomes possible to supply the control power Vcc also when the DC output voltage Vbus of the boost chopper circuit 1 is switched at the starting time of the high pressure discharge lamp LA while avoiding the size and cost increases of the control power supply circuit 5 that supplies the control power Vcc.

Figure 6:
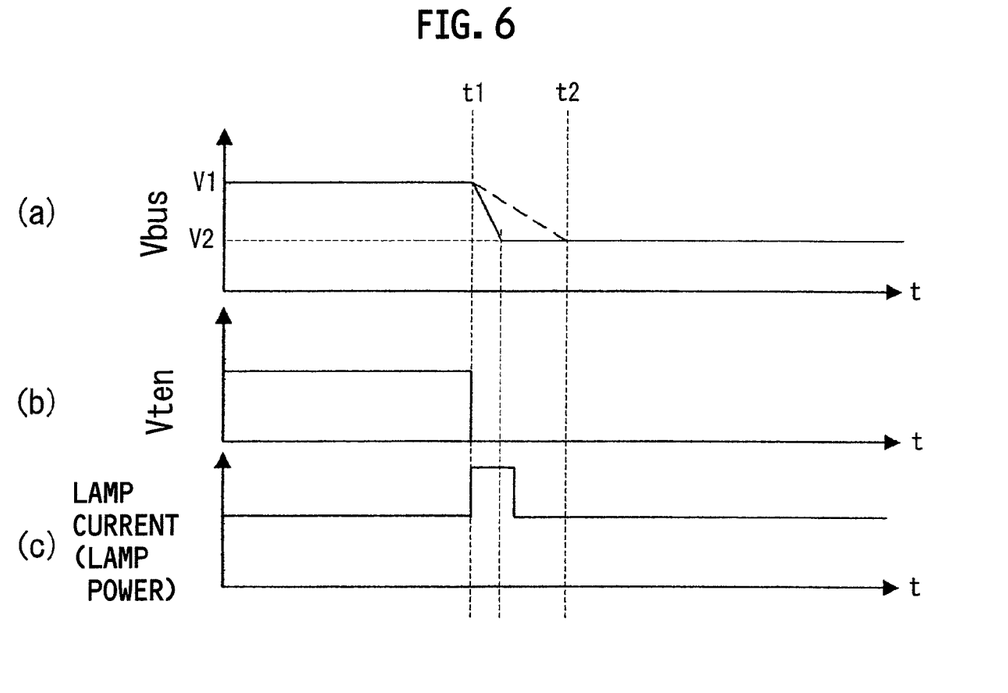
FIGS. 6(a) to 6(c) are other operation explanatory diagrams of Embodiment 2.

Note that, in Embodiments 1 and 2, it is possible to adjust the power (lamp current), which is supplied from the power conversion circuit 3 to the high pressure discharge lamp LA, by the power conversion control circuit 4. Accordingly, as illustrated in FIG. 6(c), at the same time when the control signal Vten is switched from the high-level to the low-level at the ending time point t1 of the starting mode, the power conversion control unit IC2 controls the switching elements Q3 to Q6 to temporarily increase the lamp current supplied from the power conversion circuit 3 to the high pressure discharge lamp LA. Then in this case, power consumption by the high pressure discharge lamp LA is increased, whereby the DC output voltage Vbus of the boost chopper circuit 1 is lowered rapidly (refer to a solid line of FIG. 6(a)). As a result, the stop period of the boost chopper circuit 1 can be shortened. However, when the lamp current (lamp power) is temporarily increased, a light output of the high pressure discharge lamp LA is also increased, resulting in an occurrence of flickering. Therefore, it is desired that the lamp current be increased to an extent where the flickering is not felt, for example, to an extent where an increase ratio of the light output becomes 50% or less with respect to the case where the lamp current is not increased.

Figure 7:
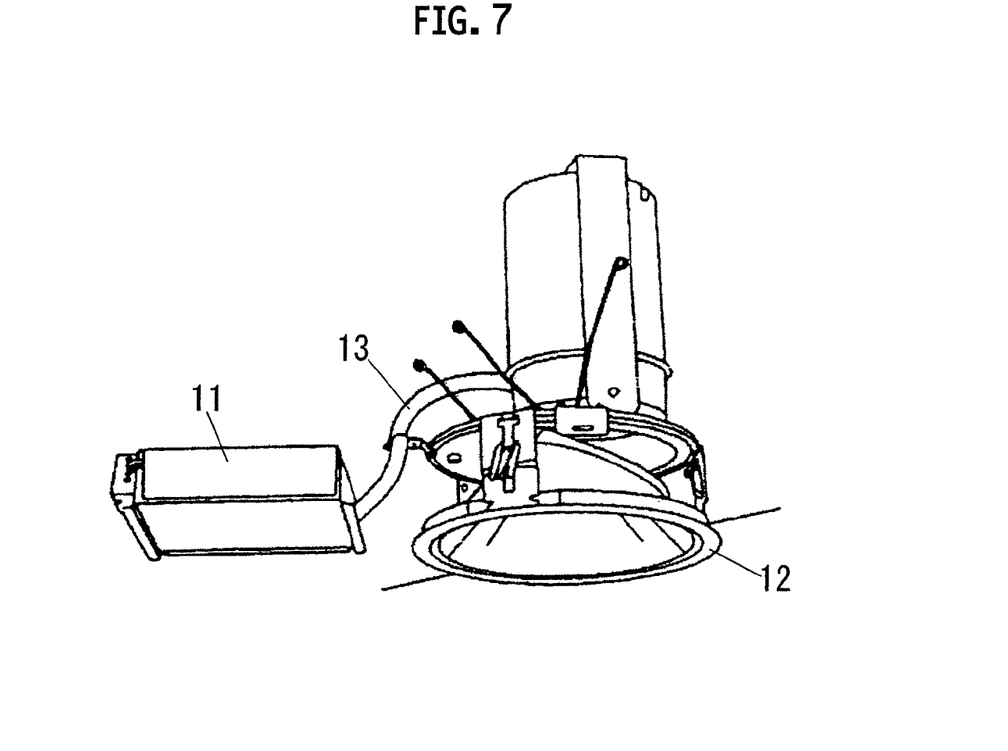
FIG. 7 is an exterior appearance perspective view illustrating an embodiment of an illumination instrument according to the present invention.

FIG. 7 is an exterior appearance perspective view of an illumination instrument including: the high pressure discharge lamp lighting device of Embodiment 1 or 2; and an instrument main body 12 that holds the high pressure discharge lamp LA. This illumination instrument is a down light in which the instrument main body 12 is embedded and arranged in an embedding hole provided on a ceiling. In the illumination instrument, the high pressure discharge lamp lighting device is housed in a case 11 with a box shape, and the high pressure discharge lamp lighting device in the case 11 and the high pressure discharge lamp LA are electrically connected to each other by a cable 13.

INDUSTRIAL APPLICABILITY

The present invention can be used as a technology for making it possible to supply the control power also when the DC output voltage of the boost chopper circuit is switched at the starting time of the high pressure discharge lamp while avoiding the size and cost increases of the power supply circuit that supplies the control power.

REFERENCE SIGNS LIST

1 boost chopper circuit
2 boost chopper control circuit
2a voltage detection circuit
3 power conversion circuit
4 power conversion control circuit
IC1 boost chopper control unit
IC2 power conversion control unit

The invention claimed is:

1. A high pressure discharge lamp lighting device comprising:
    a boost chopper circuit that boosts a DC input voltage to a desired DC output voltage;
    a boost chopper control circuit that controls the boost chopper circuit to allow a DC output voltage of the boost chopper circuit to coincide with the desired DC output voltage;
    a power conversion circuit that converts the DC output of the boost chopper circuit into power necessary to start and light a high pressure discharge lamp;
    a power conversion control circuit that controls the power conversion circuit to adjust the power to be supplied to the high pressure discharge lamp; and
    a control power supply circuit that supplies a control power for an operation to at least the boost chopper control circuit, wherein
    the boost chopper circuit includes an inductor, a switching element that connects and disconnects a current flowing through the inductor, a rectifier that rectifies the current flowing out from the inductor, and a smoothing capacitor that smoothes the current rectified by the rectifier,
    the control power supply circuit includes a winding magnetically coupled to the inductor of the boost chopper circuit, and obtains the control power by rectifying and smoothing an induced voltage induced in the winding,
    the boost chopper control circuit detects the DC output voltage of the boost chopper circuit, and performs feedback control so as to allow a detected value of the DC output voltage to coincide with a target value thereof,
    at a starting time of the high pressure discharge lamp, the boost chopper control circuit controls the DC output voltage of the boost chopper circuit to coincide with a first DC output voltage,
    after the high pressure discharge lamp is started, the boost chopper control circuit allows the output voltage of the boost chopper circuit to coincide with a second DC output voltage lower than the first DC output voltage after the high pressure discharge lamp is started, and
    in an event of switching the DC output voltage of the boost chopper circuit from the first DC output voltage to the second DC output voltage, the boost chopper control circuit operates the boost chopper circuit intermittently thereby the DC output voltage of the boost chopper circuit is switched to a third target value corresponding to a third DC output voltage lower than the first DC output voltage and higher than the second DC output voltage or to a third detected value corresponding to the third DC output voltage, and thereafter, the DC output voltage of the boost chopper circuit is switched to a second target value corresponding to the second DC output voltage or a second detected value corresponding to the second DC output voltage.

2. The high pressure discharge lamp lighting device according to claim 1, wherein a voltage difference between the first DC output voltage and the second DC output voltage is 30 volts or more.

3. An illumination instrument comprising:
   the high pressure discharge lamp lighting device according claim 1; and
   an instrument main body that holds the high pressure discharge lamp lighting device and a high pressure discharge lamp.

4. An illumination instrument comprising:
   the high pressure discharge lamp lighting device according to claim 2; and
   an instrument main body that holds the high pressure discharge lamp lighting device and a high pressure discharge lamp.

* * * * *